(12) United States Patent
Gutierrez

(10) Patent No.: US 11,338,666 B2
(45) Date of Patent: May 24, 2022

(54) HEAT EXCHANGING SYSTEM

(71) Applicant: DENSO International America, Inc., Southfield, MI (US)

(72) Inventor: Luis David Gutierrez, Leon (MX)

(73) Assignee: DENSO International America, Inc., Southfield, MI (US)

( * ) Notice: Subject to any disclaimer, the term of this patent is extended or adjusted under 35 U.S.C. 154(b) by 132 days.

(21) Appl. No.: 16/810,174

(22) Filed: Mar. 5, 2020

(65) Prior Publication Data
US 2021/0278135 A1 Sep. 9, 2021

(51) Int. Cl.
*B60K 11/04* (2006.01)
*F01P 3/18* (2006.01)
*F28D 1/053* (2006.01)
*F28D 1/02* (2006.01)

(52) U.S. Cl.
CPC ............ *B60K 11/04* (2013.01); *F01P 3/18* (2013.01); *F28D 1/0233* (2013.01); *F28D 1/05316* (2013.01); *F01P 2050/22* (2013.01); *F28F 2275/04* (2013.01)

(58) Field of Classification Search
CPC ......... B60K 11/04; F01P 3/18; F01P 2050/22; F28D 1/0233; F28D 1/05316; F28F 9/002; F28F 2275/04
See application file for complete search history.

(56) References Cited

U.S. PATENT DOCUMENTS

| 1,737,057 | A | * | 11/1929 | Muir | B60K 11/04 |
| | | | | | 180/68.4 |
| 5,139,080 | A | * | 8/1992 | Bolton | F28F 9/002 |
| | | | | | 165/149 |
| 5,183,103 | A | * | 2/1993 | Tokutake | F28F 9/002 |
| | | | | | 165/67 |
| 5,685,364 | A | | 11/1997 | Harris | |
| 5,947,196 | A | | 9/1999 | Halm et al. | |
| 7,051,789 | B2 | | 5/2006 | Sheppard | |
| 7,117,927 | B2 | | 10/2006 | Kent et al. | |
| 7,703,730 | B2 | * | 4/2010 | Best, Jr. | F01P 3/18 |
| | | | | | 248/220.22 |
| 2001/0004010 | A1 | | 6/2001 | Halm | |
| 2003/0230397 | A1 | * | 12/2003 | Southwick | F28F 9/002 |
| | | | | | 165/67 |

(Continued)

FOREIGN PATENT DOCUMENTS

EP 1484569 A2 12/2004

*Primary Examiner* — Eric S Ruppert
*Assistant Examiner* — Hans R Weiland
(74) *Attorney, Agent, or Firm* — Brooks Kushman P.C.

(57) ABSTRACT

A system for attaching a heat exchanger to a vehicle includes a first bracket and a second bracket. The first bracket is secured to the heat exchanger and has a first plate. The first plate includes front and back surfaces. The first plate defines first and second notches on opposing peripheral edges of the first plate. The second bracket is secured to the vehicle. The second bracket has a second plate, a hook, and a clip. The second plate has an outer surface. The hook and the clip extend from opposing edges of the outer surface. The outer surface is configured to engage the front surface of the first plate. The hook and the clip are configured to extend through the first and second notches, respectively, and to engage the back surface of the first plate to secure the second bracket to the first bracket.

26 Claims, 5 Drawing Sheets

(56) References Cited

U.S. PATENT DOCUMENTS

| | | | |
|---|---|---|---|
| 2004/0035551 A1* | 2/2004 | Tamura | F28F 9/002 165/41 |
| 2004/0261973 A1 | 12/2004 | Kent et al. | |
| 2005/0008428 A1* | 1/2005 | Desai | F28F 9/002 403/13 |
| 2005/0236141 A1* | 10/2005 | Faure | F28F 9/002 165/67 |
| 2010/0154188 A1* | 6/2010 | Corser | F28F 9/002 29/426.1 |

\* cited by examiner

HEAT EXCHANGING SYSTEM

TECHNICAL FIELD

The present disclosure relates to heat exchangers, particularly to tube and fin type heat exchangers.

BACKGROUND

Tube and fin heat exchangers may be utilized to transfer heat between a fluid flowing through the tubes of the heat exchanger and air that is being direct across the fins of the heat exchanger.

SUMMARY

A heat exchanger includes a first header, a second header, a plurality of tubes, a first bracket, and a second bracket. The plurality of tubes extends between the first and second headers. The plurality of tubes is configured to channel fluid between the first and second headers. The first bracket has a coupling plate and a protrusion. The coupling plate has front and back surfaces facing in opposing directions relative to each other. The coupling plate defines first and second notches on opposing peripheral edges of the coupling plate. The protrusion extends outward from the back surface and secures the first bracket to the first header. The second bracket has an outer surface, a hook, and a clip. The hook and the clip extend from opposing edges of the outer surface. The outer surface is disposed against the front surface of the coupling plate. The hook and the clip extend through the first and second notches, respectively, and engage the back surface of the coupling plate to secure the second bracket to the first bracket.

A system for attaching a heat exchanger to a vehicle includes a first bracket and a second bracket. The first bracket is secured to the heat exchanger. The first bracket has a first plate. The first plate includes a front surface that faces away from the heat exchanger and a back surface that faces toward the heat exchanger. The first plate defines first and second notches on opposing peripheral edges of the first plate. The second bracket is secured to the vehicle. The second bracket has a second plate, a hook, and a clip. The second plate has an outer surface. The hook and the clip extend from opposing edges of the outer surface. The outer surface is configured to engage the front surface of the first plate. The hook and the clip are configured to extend through the first and second notches, respectively, and to engage the back surface of the first plate to secure the second bracket to the first bracket.

A heat exchanging system includes a heat exchanger, a first bracket, and a second bracket. The first bracket is secured to the heat exchanger via brazing, the first bracket has a coupling plate that is separated from the heat exchanger. The coupling plate defines first and second notches on outer peripheral edges of the coupling plate. The second bracket has a hook and a clip extending from outer edges of the second bracket. The hook and the clip extend through the first and second notches, respectively, such that the coupling plate is disposed between the second bracket and ends of the hook and clip, and such that the hook and clip engage a back surface of the coupling plate to secure the second bracket to the first bracket.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
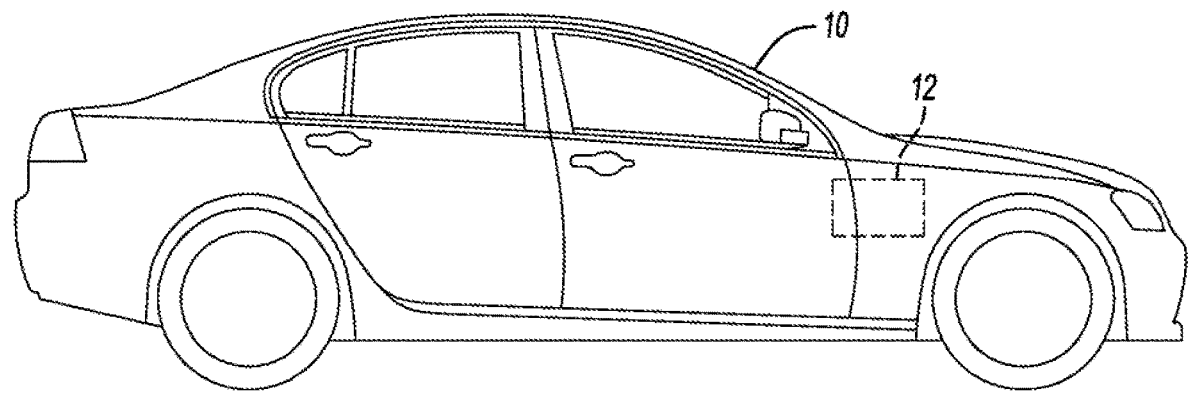
FIG. 1 is a schematic representation of a vehicle having a subsystem.

Referring to FIG. 1, a vehicle 10 having a subsystem 12 is illustrated. The subsystem 12 is a vehicle system that includes a heat exchanger. For example, the subsystem 12 may be a refrigeration unit that includes first and second heat exchangers (e.g., an evaporator and a condenser). Such a refrigeration unit may be a portion of a heating, ventilation, and air conditioning (HVAC) system or may be portion of a system that is configured to heat or cool a specific vehicle subcomponent, such as a battery (particularly in hybrid or electric vehicles). Alternatively, the subsystem 12 may be a cooling system for an internal combustion engine that includes one or more heat exchangers (e.g., a radiator or a heater core), may be a cooling system for a transmission that includes a heat exchanger (e.g., a transmission oil cooler), may be a cooling system for engine oil that includes a heat exchanger (e.g., an engine oil cooler), or may be any other heating or cooling system in a vehicle that includes a heat exchanger. It should be noted that the position of the subsystem 12 in FIG. 1 is for illustrated purposes and that the subsystem 12 may be located at any position within the vehicle 10.

Figure 2:
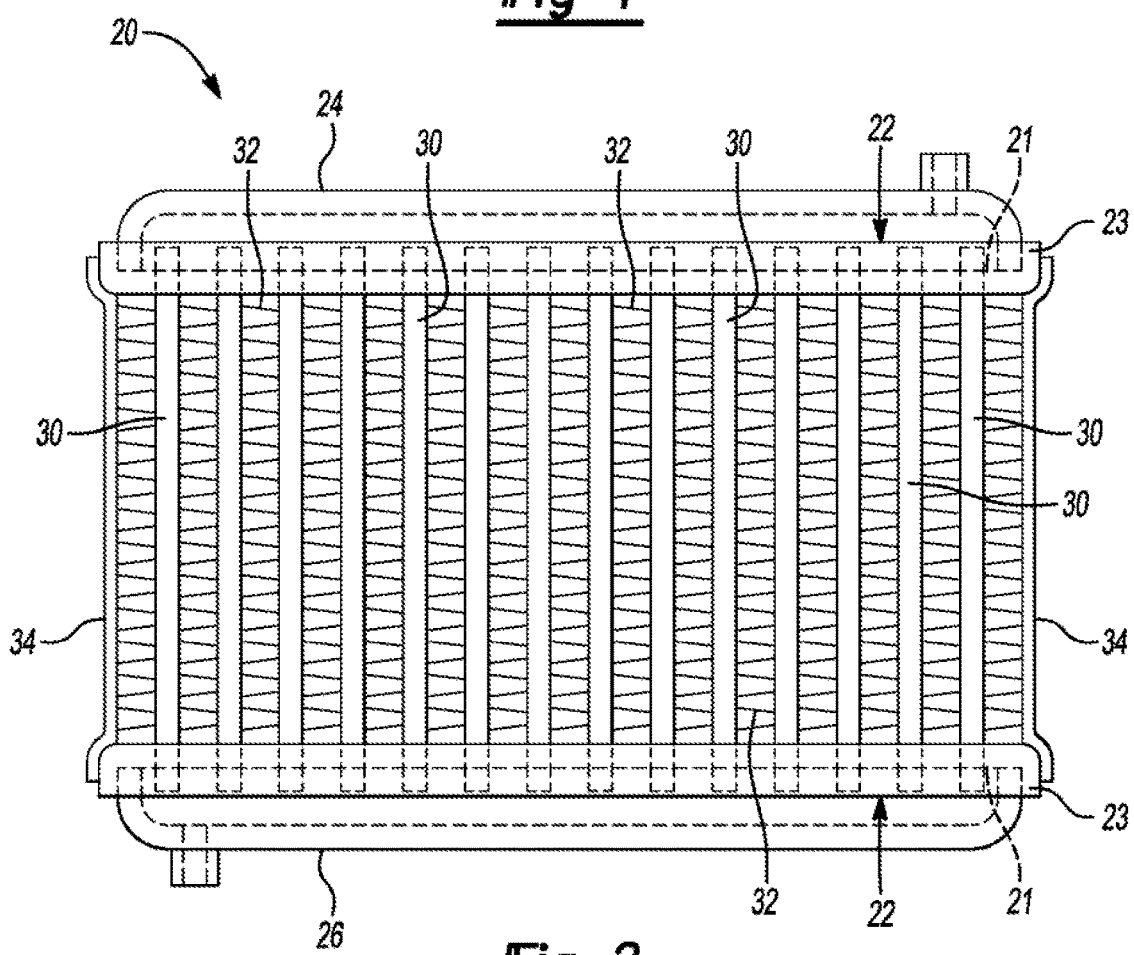
FIG. 2 is a front view of a heat exchanger.

Referring to FIG. 2, a heat exchanger 20 is illustrated. Please note that FIG. 2 is a simplified drawing and that the respective components described in FIG. 2 may have other features or different geometries than illustrated in FIG. 2. The heat exchanger 20 includes a first header tank 24 and a second header tank 26. A first header 22 is secured to the first header tank 24 and a second header 22 is secured to the second header tank 26. Each header 22 includes a face plate 21 and an exterior peripheral wall 23 that extends from the face plate 21 along a bend. The face plate 21 and the exterior peripheral wall 23 may be made from a common stock component, such as a flat piece of sheet metal.

Each header 22 defines a plurality of orifices. More specifically, each header plate 21 of each header 22 defines a plurality of orifices. A plurality of tubes 30 extend between the first header tank 24 and the second header tank 26. More specifically, a first end of each of the tubes 30 extends into a respective one of the plurality of orifices of the first header 22 while a second end of each of the tubes 30 extends into a respective one of the plurality of orifices of the second header 22. Each of the plurality of tubes 30 may extend into and may be secured to the headers 22, or more specifically may extend into and may be secured to the face plates 21, by brazing each tube 30 to the headers 22 proximate the respective orifices that the first and second ends of the tubes 30 extend into. The plurality of tubes 30 are configured to channel a coolant, a refrigerant, or any other heat exchanging liquid or gas between the first header tank 24 and the second header tank 26. Coils or fins 32 are disposed between adjacent tubes 30 forming an array of alternating tubes 30 and fins 32. The fins 32 facilitate heat transfer between the liquid or gas that is flowing through the plurality of tubes 30 and air that is being directed across the heat exchanger 20.

A pair of side plates 34 may be disposed on opposing ends of the array of alternating tubes 30 and fins 32. Each side plate 34 may be adjacent to the last set of fins 32 forming the array of alternating tubes 30 and fins 32 (as illustrated in FIG. 2) or may be adjacent to the last tube 30 forming the army of alternating tubes 30 and fins 32. The side plates 34 may extend between the first and second headers 22 and may be secured to the first and second headers 22 by a brazing or welding process.

It should be noted that the first header tank 24 and the first of the headers 22 may be formed as a single component that are not distinct from each other and that the second header tank 26 and the second of the headers 22 may be formed as a single component that are not distinct from each other. For example, a single tube, pipe, tank, reservoir, etc. that defines orifices that receive each of the plurality tubes 30 may be utilized in place of the first header tank 24 and the first of the headers 22 and/or may be utilized in place of the second header tank 26 and the second of the headers 22. It should be understood that the heat exchanger 20 depicted in FIG. 2 is for illustrative purposes and that FIG. 2 is a general representation of a heat exchanger. Heat exchangers having different geometries, additional components, or fewer components should be construed as disclosed herein.

Figure 3:
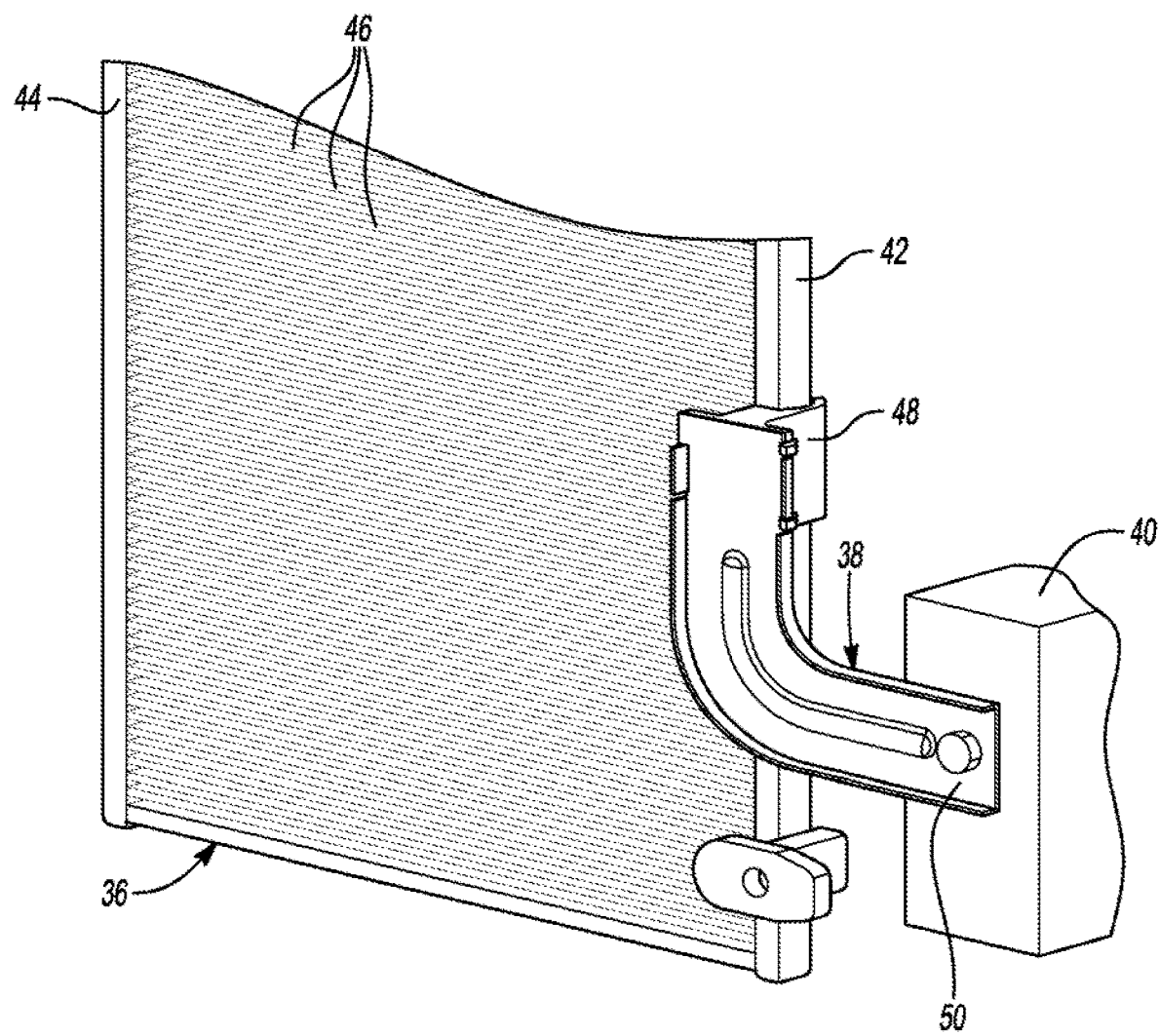
FIG. 3 is a partial isometric view of a heat exchanger this is secured to a vehicle and a system for attaching the heat exchanger to the vehicle.

Referring to FIG. 3, a partial isometric view of a heat exchanger 36 this is secured to a vehicle and a system 38 for attaching the heat exchanger 36 to the vehicle are illustrated. More specifically, the heat exchanger 36 may be secured to the frame or body of the vehicle, or may be secured to a subcomponent 40 of the vehicle, such as the transmission, the engine, etc. The heat exchanger 36 may include some or all of same the components of the heat exchanger 20 described in FIG. 2. For example, the heat exchanger 36 includes a first header tank 42, a second header tank 44, and a plurality of tubes 46 that extend between the first header tank 42 and the second header tank 44. The plurality of tubes 46 are configured to channel a coolant, a refrigerant, or any other heat exchanging liquid or gas between the first header tank 42 and the second header tank 44.

The system 38 for attaching the heat exchanger 36 to the vehicle, or more specifically the system for attaching the heat exchanger 36 to the subcomponent 40 of the vehicle, includes a first bracket 48 that is secured to the heat exchanger 36 and a second bracket 50 that is secured to the vehicle or subcomponent 40 of the vehicle. The first bracket 48 may more specifically be secured to the first header tank 42. The second bracket 50 may more specifically be secured to the frame of the vehicle, the body of the vehicle, or to the subcomponent 40 of the vehicle. The first bracket 48 may be secured to the heat exchanger 36 via brazing. The second bracket 50 may be secured to the vehicle or subcomponent 40 of the vehicle via fasteners or any other known method. The first bracket 48 interacts with the second bracket 50 to secure the heat exchanger 36 to the vehicle or, more specifically, to secure the heat exchanger 36 to the subcomponent 40 of the vehicle. The first bracket 48 and the second bracket 50 are secured to each other to create a chain of components that secures the heat exchanger 36 to the vehicle or subcomponent 40 of the vehicle. Additional sets of brackets may be utilized to secure the heat exchanger 36 to the vehicle or to the subcomponent 40 of the vehicle. For example, third and fourth brackets may be secured to the second header tank 44 and a second subcomponent of the vehicle, respectively, where the third and fourth brackets interact with each other to create a chain of components that secures the heat exchanger 36 to the vehicle or to the second subcomponent of the vehicle.

Figure 4:
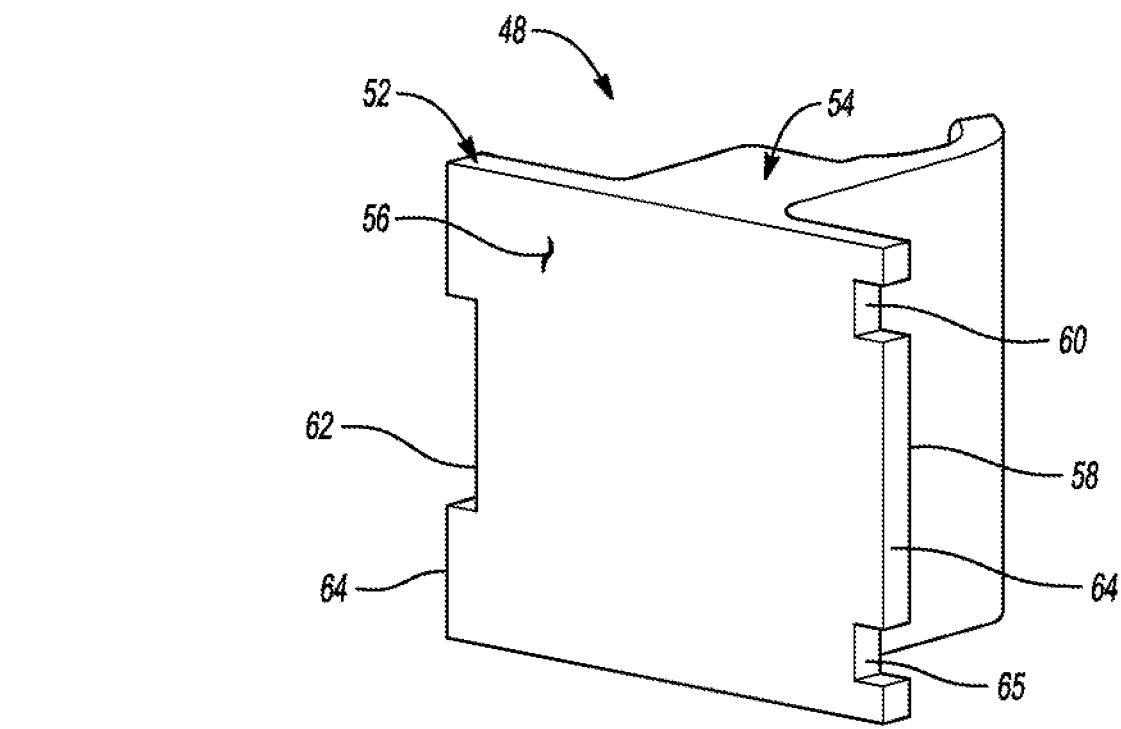
FIG. 4 is an isometric view of a first bracket of the system for attaching the heat exchanger to the vehicle.

Referring FIG. 4, an isometric view of the first bracket 48 is illustrated. The first bracket 48 has a coupling plate 52 and a protrusion 54. When the first bracket 48 is installed onto a heat exchanger, the coupling plate 52 may be spaced apart from and/or separated from the heat exchanger (see FIG. 3). More specifically, the coupling plate 52 may be spaced apart from and/or separated from the heat exchanger via the protrusion 54. The coupling plate 52 may also be referred to as the first plate. The coupling plate 52 has front surface 56 and a back surface 58. When the first bracket 48 is installed onto a heat exchanger (see FIG. 3), the front surface 56 may face away from the heat exchanger and the back surface 58 may face toward the heat exchanger. The front surface 56 and the back surface 58 face in opposing or opposite directions relative to each other. The coupling plate 52 defines a first notch 60 and a second notch 62 on opposing peripheral edges 64 of the coupling plate 52. The coupling plate 52 also defines a third notch 65 that is on the opposing peripheral edge 64 of the coupling plate 52 that is opposite of the second notch 62. The second notch 62 may be wider than the first notch 60 and the third notch 65. Also, in a direction that extends from the top to the bottom of FIG. 4, the second notch 62 may be disposed between than the first notch 60 and third notch 65. The protrusion 54 extends outward from the back surface 58 of the coupling plate 52 and secures the first bracket 48 to the heat exchanger 36, or more specifically to the first header 42 of the heat exchanger 36. Alternatively, the first notch 60, the second notch 62, and the third notch 65 may be defined directly by the header of a heat exchanger or a component that extends directly from the header of a heat exchanger.

Figure 5:
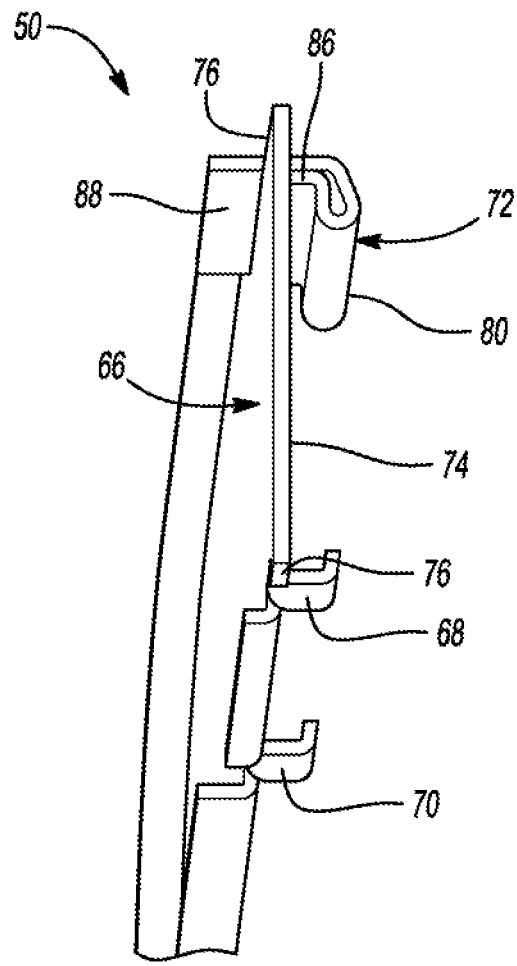
FIG. 5 is a partial isometric view of a second bracket of the system for attaching the heat exchanger to the vehicle.
Figure 6:
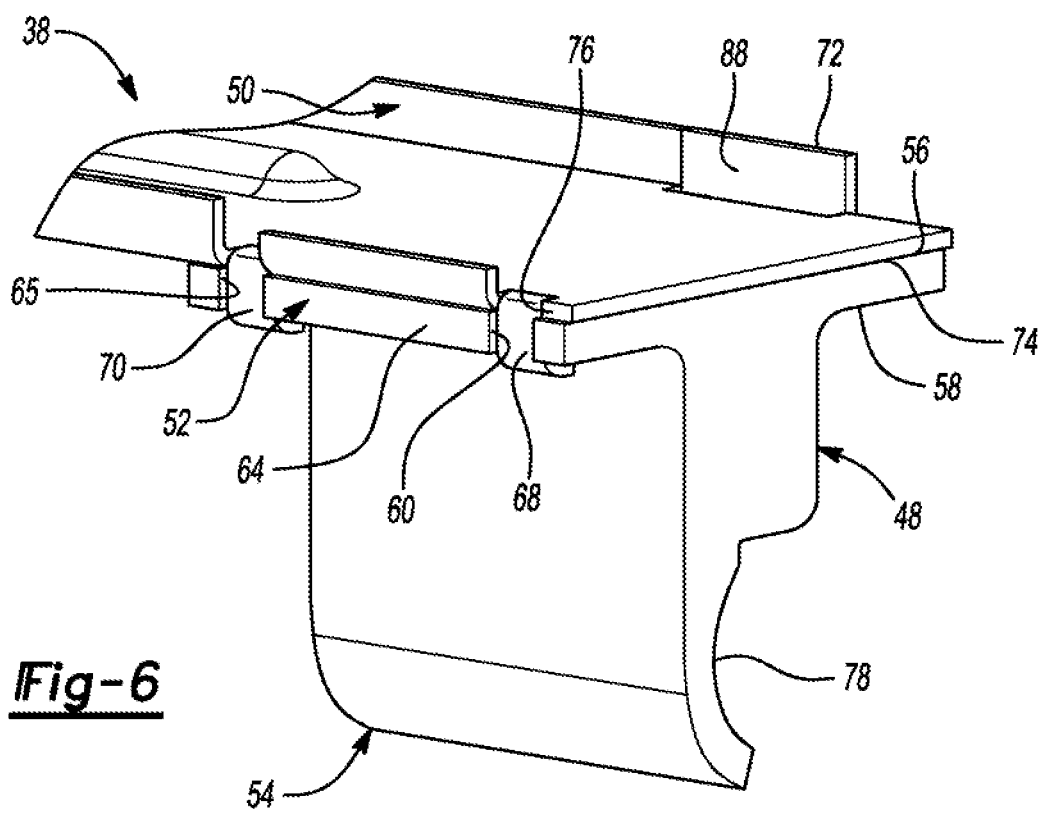
FIG. 6 is a first partial isometric view illustrating the engagement between the first and second brackets of the system for attaching the heat exchanger to the vehicle.
Figure 7:
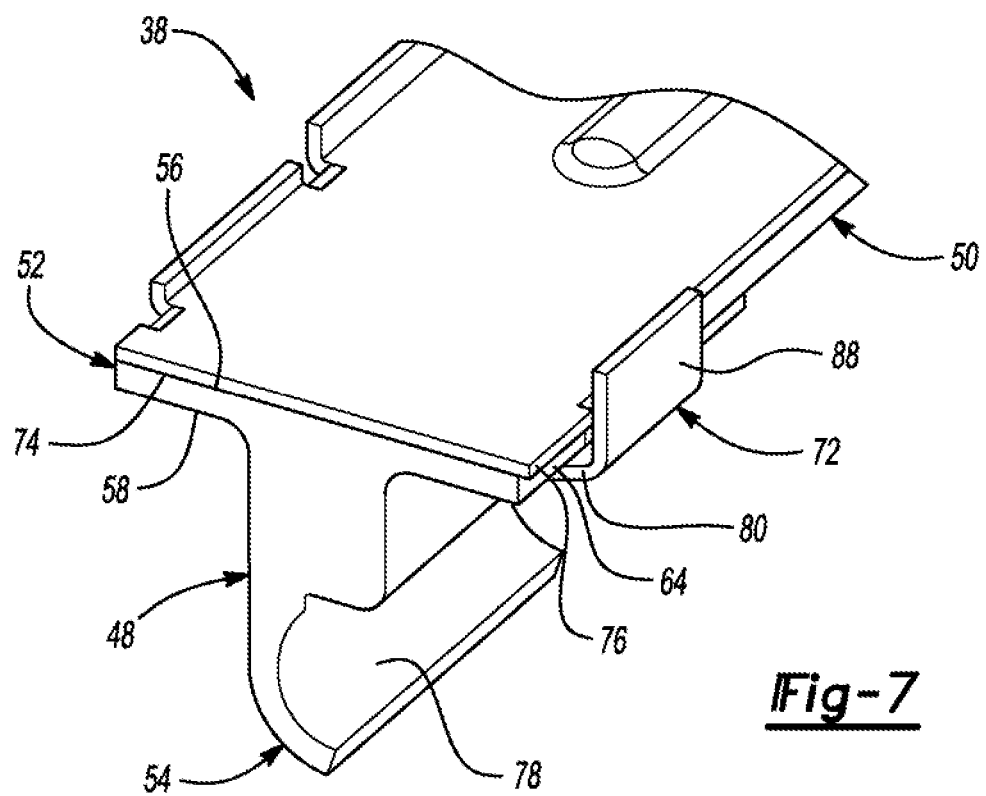
FIG. 7 is a second partial isometric view illustrating the engagement between the first and second brackets of the system for attaching the heat exchanger to the vehicle.
Figure 8:
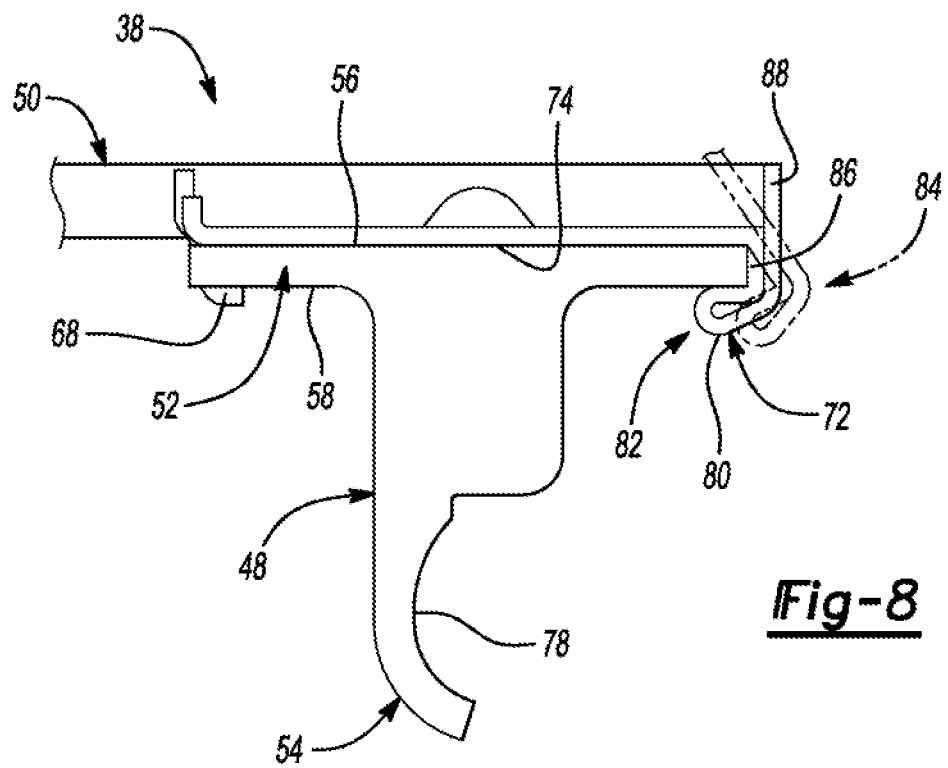
FIG. 8 is a partial top view illustrating the engagement between the first and second brackets of the system for attaching the heat exchanger to the vehicle.
Figure 9:
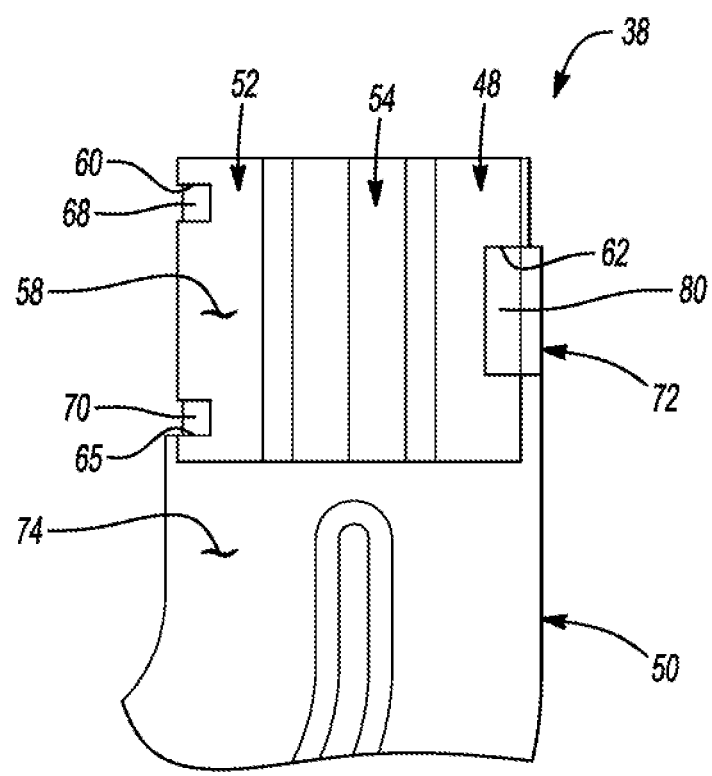
FIG. 9 is a partial front view illustrating the engagement between the first and second brackets of the system for attaching the heat exchanger to the vehicle.

Referring FIG. 5, an isometric view of the second bracket 50 is illustrated. The second bracket 50 has a second plate 66, a first hook 68, a second hook 70, and a clip 72. A clip may be a device that grips and holds onto another object or may be a device that holds an object or objects together or in place. A clip may be flexible and/or may be operated by a spring. The second plate 66 has an outer surface 74. The first hook 68 and the clip 72 extend from opposing or opposite outer edges 76 of the second bracket 50. More specifically, the first hook 68 and the clip 72 may extend from opposing or opposite edges of the outer surface 74. The first hook 68 and the clip 72 may extend away from the second bracket 50, or more specifically away from the outer surface 74, in the same direction. The second hook 70 may also extend from the opposing or opposite outer edge 76 of the second bracket 50 relative to the clip 72. More specifically, the second hook 70 may also extend from the opposing or opposite outer edge of the outer surface 74 that is opposite of the clip 72. The second hook 70 may also extend away from the second bracket 50, or more specifically away from the outer surface 74, in the same direction as the first hook 68 and the clip 72.

Referring to FIGS. 6-9 the engagement between the first bracket 48 and the second bracket 50 of the system 38 for attaching the heat exchanger 36 to the vehicle, or more specifically the system for attaching the heat exchanger 36 to the subcomponent 40 of the vehicle, is illustrated. The outer surface 74 of the second bracket 50 is disposed against the front surface 56 of the coupling plate 52 when there is engagement between the first bracket 48 and the second bracket 50 to secure the first bracket 48 to the second bracket 50. Also, when there is engagement between the first bracket 48 and the second bracket 50, the first hook 68 extends through the first notch 60, the second hook 70 extends through the third notch 65, the clip 72 extends through the second notch 62, and each of the first hook 68, second hook 70, and clip 72 engage the back surface 58 of the coupling plate 52 to secure the first bracket 48 to the second bracket 50. The coupling plate 52 is also disposed between the second bracket 50, or more specifically the outer surface 74 of the second bracket 50, and the ends of the first hook 68, second hook 70, and clip 72 that engage the back surface 58 of the coupling plate 52 when there is engagement between the first bracket 48 and the second bracket 50.

The protrusion 54 of the first bracket 48 may define a groove 78. A portion of the heat exchanger 36 may be disposed within the groove 78. More specifically, the first header 42 may be disposed within the groove 78 (See FIG. 3). The protrusion 54, and therefore the first bracket 48, may be secured to the heat exchanger 36, or more specifically may be secured to the first header 42, via brazing within the groove 78.

The clip 72 includes a head portion 80 that is configured to transition between a first position 82 and a second position 84. The first position 82 may be referred to as the engaged position. The second position 84 may be referred to as the disengaged position. In the first position 82, the head portion 80 of the clip 72 engages the back surface 58 of the coupling plate 52 to secure the first bracket 48 to the second bracket 50. In the second position 84, the head portion 80 of the clip 72 disengages the back surface 58 of the coupling plate 52 such the first bracket 48 is disengaged and may be removed from the second bracket 50. The clip includes a spring portion 86 that biases the head portion 80 into engagement with the back surface 58 of the coupling plate 52 in order to secure the first bracket 48 to the second bracket 50. The spring portion 86 connects the head portion 80 to one of the opposing or opposite outer edges 76 of the second bracket 50, or more specifically to one of the opposing or opposite outer edges outer surface 74 of the second bracket 50. The clip includes a lever arm 88 that extends from the head portion 80. The lever arm 88 is configured to transition the head portion 80 from the first position 82 to the second position 84 upon engagement of the lever arm 88 (e.g., a user pushing against the lever arm). Once the lever arm 88 has been released, the spring portion 86 will return the head portion 80 to the first position 82.

The hook and clip design described herein allows for two brackets (i.e., one attached to a heat exchanger and one attached to a vehicle) to directly attach to each other in order to secure a heat exchanger to a vehicle. Such a design reduces the number of components that are required to attach the heat exchanger to the vehicle by eliminating the need for fasteners to attach the heat exchanger to the vehicle. The design also allows for quick installation and removal of the heat exchanger by eliminating the need to utilize a tool for tightening or loosening fasteners and by including a lever mechanism that allows for a quick release of the heat exchanger by simply pushing on the lever arm to disengage the clip.

It should be understood that the designations of first, second, third, fourth, etc. for hooks, notches, brackets, plates, surfaces, edges, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A heat exchanger comprising:
   first and second headers;
   a plurality of tubes extending between the first and second headers and configured to channel fluid between the first and second headers;
   a first bracket having a coupling plate and a protrusion, the coupling plate having front and back surfaces facing in opposing directions relative to each other and defining first and second notches on opposing outer peripheral edges of the coupling plate, the protrusion extending outward from the back surface and securing the first bracket to the first header; and
   a second bracket having an outer surface, a hook, and a clip, the hook and the clip extending from opposing edges of the outer surface, wherein the outer surface is disposed against the front surface of the coupling plate, and wherein the hook and the clip extend through the first and second notches, respectively, and engage the back surface of the coupling plate to secure the second bracket to the first bracket, wherein the hook has (i) a first portion that extends along the front surface of the coupling plate, (ii) a second portion that extends along the outer peripheral edge within the first notch, and (iii) a third portion that extends along the back surface of the coupling plate, wherein the hook transition from the first portion to the second portion along a first bend and from the second portion to the third portion along a second bend, and wherein the clip engages (i) the back surface of the coupling plate and (ii) the opposing outer peripheral edge within the second notch.

2. The heat exchanger of claim 1, wherein the coupling plate defines a third notch on the opposing peripheral edge of the coupling plate that is opposite of the second notch, and wherein the second bracket has a second hook that extends from the opposing edge of the outer surface that is opposite of the clip, through the third notch, and engages the back surface of the coupling plate to secure the second bracket to the first bracket.

3. The heat exchanger of claim 1, wherein the clip includes a head portion that is configured to transition between first and second positions, and wherein the head portion is configured to engage the back surface of the coupling plate when in the first position and to disengage the back surface of the coupling plate when in the second position.

4. The heat exchanger of claim 3, wherein the clip includes a spring portion that biases the head portion into engagement with the back surface, and wherein the spring portion engages the opposing outer peripheral edge of the coupling plate within the second notch.

5. The heat exchanger of claim 4, wherein the spring portion connects the head portion to one of the opposing edges of the outer surface.

6. The heat exchanger of claim 5, wherein the clip includes a lever arm that extends from the head portion and is configured to transition the head portion from the first position to the second position upon engagement of the lever arm, and wherein the lever arm extends along an outer peripheral edge of the second bracket from the head portion, which protrudes from a forward surface of the second bracket, to beyond a rearward surface of the second bracket that is opposite of the forward surface.

7. The heat exchanger of claim 1, wherein the protrusion defines a groove, and wherein the first header is disposed within the groove.

8. The heat exchanger of claim 7, wherein protrusion is secured to the first header within the groove via brazing.

9. A system for attaching a heat exchanger to a vehicle comprising:
a first bracket secured to the heat exchanger, the first bracket having a first plate, the first plate including a front surface that faces away from the heat exchanger, including a back surface that faces toward the heat exchanger, and defining first and second notches on opposing outer peripheral edges of the first plate; and
a second bracket secured to the vehicle, the second bracket having a second plate, a hook, and a clip, the second plate having an outer surface, the hook and the clip extending from opposing edges of the outer surface, wherein the outer surface is configured to engage the front surface of the first plate, and wherein the hook and the clip are configured to extend through the first and second notches, respectively, and to engage the back surface of the first plate to secure the second bracket to the first bracket, wherein the hook has (i) a first portion that extends along the front surface of the first plate, (ii) a second portion that extends along the outer peripheral edge within the first notch, and (iii) a third portion that extends along the back surface of the first plate, wherein the hook transition from the first portion to the second portion along a first bend and from the second portion to the third portion along a second bend, and wherein the clip engages (i) the back surface of the first plate and (ii) the opposing outer peripheral edge within the second notch.

10. The system of claim 9, wherein the first plate defines a third notch on the opposing peripheral edge of the first plate that is opposite of the second notch, and wherein the second bracket has a second hook that extends from the opposing edge of the outer surface that is opposite the clip, through the third notch, and engages the back surface of the first plate to secure the second bracket to the first bracket.

11. The system of claim 9, wherein the clip includes a head portion that is configured to transition between first and second positions, and wherein the head portion is configured to engage the back surface of the first plate when in the first position and to disengage the back surface of the first plate when in the second position.

12. The system of claim 11, wherein the clip includes a spring portion that biases the head portion into engagement with the back surface, and wherein the spring portion engages the opposing outer peripheral edges of the first plate within the second notch.

13. The system of claim 12, wherein the spring portion connects the head portion to one of the opposing edges of the outer surface.

14. The system of claim 11, wherein the clip includes a lever arm that extends from the head portion and is configured to transition the head portion from the first position to the second position upon engagement of the lever arm, and wherein the lever arm extends along an outer peripheral edge of the second bracket from the head portion, which protrudes from a forward surface of the second bracket, to beyond a rearward surface of the second bracket that is opposite of the forward surface.

15. The system of claim 9, wherein the first bracket includes a protrusion that extends from the first plate, and wherein the protrusion is brazed to the heat exchanger to secure the first bracket to the heat exchanger.

16. A heat exchanging system comprising:
a heat exchanger;
a first bracket secured to the heat exchanger via brazing, the first bracket having a coupling plate that is separated from the heat exchanger, the coupling plate defining first and second notches on opposing outer peripheral edges of the coupling plate; and
a second bracket having a hook and a clip extending from outer edges of the second bracket, wherein the hook and the clip extend through the first and second notches, respectively, such that the coupling plate is disposed between the second bracket and ends of the hook and clip and such that the hook and clip engage a back surface of the coupling plate to secure the second bracket to the first bracket, wherein the hook has (i) a first portion that extends along the front surface of the coupling plate, (ii) a second portion that extends along the outer peripheral edge within the first notch, and (iii) a third portion that extends along the back surface of the coupling plate, wherein the hook transition from the first portion to the second portion along a first bend and from the second portion to the third portion along a second bend, and wherein the clip engages (i) the back surface of the coupling plate and (ii) the opposing outer peripheral edge within the second notch.

17. The heat exchanger of claim 16, wherein the clip includes a head portion that is configured to transition between first and second positions, and wherein the head portion is configured to engage the back surface of the coupling plate when in the first position and to disengage the back surface of the coupling plate when in the second position.

18. The heat exchanger of claim 17, wherein the clip includes a spring portion that biases the head portion into engagement with the back surface, and wherein the spring portion engages the opposing outer peripheral edges of the coupling plate within the second notch.

19. The heat exchanger of claim 18, wherein the spring portion connects the head portion to one of the outer edges of the second bracket.

20. The heat exchanger of claim 17, wherein the clip includes a lever arm that extends from the head portion and is configured to transition the head portion from the first position to the second position upon engagement of the lever arm, and wherein the lever arm extends along an outer peripheral edge of the second bracket from the head portion, which protrudes from a forward surface of the second bracket, to beyond a rearward surface of the second bracket that is opposite of the forward surface.

21. The heat exchanger of claim 1, wherein the coupling plate encloses the hook along three out of four sides of the hook within the first notch.

22. The system of claim 9, wherein the coupling plate encloses the hook along three out of four sides of the hook within the first notch.

23. The heat exchanger of claim 17, wherein the coupling plate encloses the hook along three out of four sides of the hook within the first notch.

24. The heat exchanger of claim 1, wherein the coupling plate encloses the clip along three out of four sides of the clip within the second notch.

25. The system of claim 9, wherein the coupling plate encloses the clip along three out of four sides of the clip within the second notch.

26. The heat exchanger of claim 17, wherein the coupling plate encloses the clip along three out of four sides of the clip within the second notch.

* * * * *